United States Patent
Gokhale et al.

(10) Patent No.: US 12,164,917 B1
(45) Date of Patent: Dec. 10, 2024

(54) TRANSPOSING AT-SPEED IN A VECTOR-MATRIX ACCELERATOR

(71) Applicant: Google LLC, Mountain View, CA (US)

(72) Inventors: Vinayak Anand Gokhale, Austin, TX (US); Matthew Leever Hedlund, Sun Prairie, WI (US); Matthew William Ashcraft, San Carlos, CA (US); Indranil Chakraborty, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/198,387

(22) Filed: May 17, 2023

(51) Int. Cl.
*G06F 9/30* (2018.01)
*G06F 9/54* (2006.01)
*G06F 17/16* (2006.01)

(52) U.S. Cl.
CPC .......... *G06F 9/30036* (2013.01); *G06F 9/544* (2013.01); *G06F 17/16* (2013.01)

(58) Field of Classification Search
CPC ......... G06F 9/30036; G06F 17/16; G06F 7/78
See application file for complete search history.

(56) References Cited

U.S. PATENT DOCUMENTS

| | | | |
|---|---|---|---|
| 4,769,790 A | 9/1988 | Yamashita | |
| 5,875,355 A * | 2/1999 | Sidwell | G06F 17/16 |
| | | | 712/E9.034 |
| 6,604,166 B1 * | 8/2003 | Jana | G06F 12/0607 |
| | | | 711/E12.003 |
| 11,275,992 B2 * | 3/2022 | Norrie | G06F 9/30141 |
| 2002/0032710 A1 * | 3/2002 | Saulsbury | G06F 9/30036 |
| | | | 712/E9.034 |
| 2019/0042248 A1 * | 2/2019 | Bradford | G06F 9/30109 |
| 2019/0187986 A1 | 6/2019 | Tran et al. | |
| 2020/0341735 A1 | 10/2020 | Sun | |
| 2022/0207107 A1 * | 6/2022 | Adelman | G06F 9/30036 |
| 2024/0111827 A1 * | 4/2024 | Kuo | G06F 17/16 |

OTHER PUBLICATIONS

International Search Report and Written Opinion for International Application No. PCT/US2024/021411 dated Jul. 17, 2024. 15 pages.

* cited by examiner

*Primary Examiner* — Jacob Petranek
(74) *Attorney, Agent, or Firm* — Lerner David LLP

(57) ABSTRACT

A system including one or more processors configured to receive a transpose instruction indicating to transpose a source matrix to a result matrix, provide data elements of the source matrix to input switching circuits, reorder the data elements using the input switching circuits, provide the data elements from the input switching circuits to one or more lanes of a datapath, provide the data elements from the datapath to output switching circuits, undo the reordering of the data elements using the output switching circuits, and provide the data elements from the output switching circuits to a result matrix. Each respective lane of the datapath receiving data elements receives multiple data elements directed to different respective non-overlapping portions of the lane.

20 Claims, 8 Drawing Sheets

FIG. 8

TRANSPOSING AT-SPEED IN A VECTOR-MATRIX ACCELERATOR

BACKGROUND

Accelerators for neural networks, such as deep neural networks (DNN), are used to perform high-density computations, such as matrix multiplication and matrix transposition. The accelerator may include systolic arrays to efficiently perform matrix multiplication, while additional circuitry may be utilized to transpose the columns and rows of a source matrix before it is fed to the systolic array. Adjacent processing elements of a systolic array, a matrix transpose unit, and other components of the accelerator, can be connected through one or more interconnects, such as wires or other physical connections, for example, on a printed circuit board.

Neural network accelerators are typically configured to process data elements of a variety of datatypes of varying bit widths, such as 8 bits and multiples thereof. For some computations performed by the accelerators, the throughput of a particular computation can easily be scaled based on the bit width of the data elements. For example, two 16-bit elements could be processed in parallel at the same speed that one 32-bit element may be processed. Such a scaling of throughput is typically referred to as "at speed" performance, since the system processes the same number of bits at a constant rate or speed regardless of whether the bits represent larger or smaller elements. Performing "at speed" computation throughout an entire pipeline is an effective way of avoiding latency issues due to bottlenecking.

However, performing "at speed" computation can be challenging for matrix transpose operations. This is because a transpose, by its nature, moves all the elements of a given row of a source matrix to the same column of a result matrix. While moving a single element from a row of the source matrix to a column of the result matrix over a datapath can be straightforward, moving multiple elements within the same cycle would require passing two elements simultaneously along the same portion of the datapath, thereby creating a data conflict. As a result, in neural network accelerators, it is typically considered necessary to perform the matrix transpose operations slower than the matrix multiplication operations. However, this has the undesirable effect of creating a bottleneck at the matrix transpose stage, thereby slowing down the matrix multiplication stage when an input matrix of the matrix multiplication stage is first transposed.

One proposed solution to maintain "at speed" computation for neural network accelerators is to dedicate double or even quadruple the logic circuitry for matrix transpose operations than is necessary. The added circuitry increases the matrix transpose throughput, but creates design complexity, adds significant costs for both materials and power, and requires additional space within the system.

Another proposed solution to maintain "at speed" computation for neural network accelerators is to pass only one element from each row to its respective column on each cycle, and to disregard the remaining elements. However, this results in disregarding half or even three-quarters of the input data at the matrix transpose stage, which still wastes half or even three-quarters of the available datapath bandwidth.

SUMMARY

The present disclosure provides a system and method capable of performing matrix transpose operations "at speed" using the available datapath bandwidth and without creating data conflicts over the datapath. This is accomplished by "swizzling," or reordering, the input data from the source matrix before passing the data over the datapath. The reordered data is arranged to ensure that each element occupies a different, non-overlapping portion of the datapath. Then, the reordering of the data can be reversed by "unswizzling" the elements in a process that is inverse to the swizzling.

The system may include one or more processors configured to receive a transpose instruction indicating to transpose a source matrix to a result matrix, provide data elements of the source matrix to input switching circuits, reorder the data elements using the input switching circuits, provide the data elements from the input switching circuits to one or more lanes of a datapath, provide the data elements from the datapath to output switching circuits, undo the reordering of the data elements using the output switching circuits, and provide the data elements from the output switching circuits to a result matrix. Each respective lane of the datapath receiving data elements receives multiple data elements directed to different respective non-overlapping portions of the lane.

One aspect of the disclosure provides for a system including: memory configured to store one or more matrices including a source matrix and a result matrix; a datapath between the source matrix and the result matrix, the datapath having a plurality of lanes, wherein each lane has a predetermined bandwidth that is divisible into multiple non-overlapping portions; one or more sets of input switching circuits; one or more sets of output switching circuits; and one or more processors configured to: receive a transpose instruction indicating to perform a transpose operation to transpose the source matrix; in a cycle of the transpose operation: provide data elements of the source matrix to each of the one or more sets of input switching circuits; reorder the data elements using the one or more sets of input switching circuits; provide the data elements from the one or more sets of input switching circuits to one or more of the plurality of lanes of the datapath, wherein each respective lane receiving data elements from the one or more sets of input switching circuits receives multiple data elements directed to different respective non-overlapping portions of the lane; provide the data elements from the datapath to each of the one or more sets of output switching circuits; undo the reordering of the data elements using the one or more sets of output switching circuits; and provide the data elements from the one or more sets of output switching circuits to a result matrix, the result matrix being a transposition of the source matrix.

In some examples, the system may further include a plurality of buffers, each lane of the datapath being configured to receive data elements of the source matrix from a respective buffer of the plurality of buffers.

In some examples, a size of each buffer may correspond to a number of cycles between when a first cycle in which data elements of the source matrix are first received at the datapath and a second cycle in which all data elements of the source matrix have been received at the datapath.

In some examples, each of the one or more sets of input switching circuits and the one or more sets of output switching circuits may include at least one multiplexer.

In some examples, each of the one or more sets of input switching circuits and the one or more sets of output switching circuits may include a plurality of multiplexer stages, the source matrix may include data elements of size $2^n$ bits, the predetermined bandwidth of the datapath may be 2^(n+k) bits, whereby k is greater than or equal to 1, and the transpose instruction may indicate to reorder and undo the reordering of the data elements of the source matrix using k multiplexer stages.

In some examples, a first multiplexer stage of the plurality of multiplexer stages may be configured to reorder data elements of size 2^n bits, and each subsequent stage of the plurality of multiplexer stages may be configured to reorder data elements twice as large as the data elements of its respective previous multiplexer stage.

In some examples, the one or more sets of input switching circuits may include two sets of input switching circuits, the one or more sets of output switching circuits may include two sets of output switching circuits, the predetermined bandwidth of the datapath may be 64 bits, and each of the two sets of input switching circuits and the two sets of output switching circuits may include three stages of multiplexers.

In some examples, the system may be configured to transpose matrices of 32-bit data elements, matrices of 16-bit data elements, and matrices of 8-bit data elements.

In some examples, the one or more processors may be configured to, in response to the transpose instruction indicating the source matrix includes 32-bit data elements, reorder the data elements using one stage of multiplexers, in response to the transpose instruction indicating the source matrix includes 16-bit data elements, reorder the data elements using two stages of multiplexers, and in response to the transpose instruction indicating the source matrix includes 8-bit data elements, reorder the data elements using three stages of multiplexers.

In some examples, the one stage of multiplexers may be configured to perform 32-bit swizzles, the two stages of multiplexers may be configured to perform 16-bit swizzles followed by 32-bit swizzles, and the three stages of multiplexers may be configured to perform 8-bit swizzles followed by 16-bit swizzles followed by 32-bit swizzles.

In some examples, the system may further include one or more matrix multiplication units, the datapath being configured to provide the result matrix to at least one of the matrix multiplication units.

In some examples, the system may be included in a neural network accelerator.

Another aspect of the disclosure is directed to a method including: receiving a source matrix and a transpose instruction indicating to perform a transpose operation to transpose the source matrix; in a cycle of the transpose operation: providing data elements of the source matrix to one or more sets of input switching circuits; reordering the data elements using the one or more sets of input switching circuits; providing the data elements from the one or more sets of input switching circuits to one or more of the plurality of lanes of a datapath, each lane having a predetermined bandwidth that is divisible into multiple non-overlapping portions, wherein each respective lane receiving data elements from the one or more sets of input switching circuits receives multiple data elements directed to different respective non-overlapping portions of the lane; providing the data elements from the datapath to one or more sets of output switching circuits; undoing the reordering of the data elements using the one or more sets of output switching circuits; and providing the data elements from the one or more sets of output switching circuits to a result matrix, wherein the result matrix is a transposition of the source matrix.

In some examples, reordering the data elements using the one or more sets of input switching circuits may include passing the data elements through a plurality of multiplexers.

In some examples, passing the data elements through a plurality of multiplexers may include: receiving a transpose instruction indicating a bit size of each data element in the source matrix to transpose; and passing the data elements through one or more stages of multiplexers based on the bit size, each bit size being associated with a different number of stages of multiplexers.

In some examples, the predetermined bandwidth of the datapath may be 64 bits, and passing the data elements through one or more stages of multiplexers based on the bit size may involve selecting between one, two and three stages of multiplexers depending on the bit size.

In some examples, the one or more sets of input switching circuits may include first and second sets of input switching circuits connected to respective first and second crossbars, and for the transpose instruction indicating a bit size of 32 bits, passing the data elements through one or more stages of multiplexers may involve, for each block of four data elements in the source matrix: splitting the block between upper bits and lower bits; at the first set of input switching circuits, swapping 16-bit portions of the upper bits with each other; at the second set of input switching circuits, swapping 16-bit portions of the lower bits with each other; and directing the upper bits from the first set of input switching circuits to the first crossbar and the lower bits from the second set of input switching circuits to the second crossbar.

In some examples, the one or more sets of input switching circuits may include first and second sets of input switching circuits connected to respective first and second crossbars, and for the transpose instruction indicating a bit size of 16 bits, passing the data elements through one or more stages of multiplexers may involve, for each block of eight data elements in the source matrix: splitting the block between upper bits and lower bits; at the first set of input switching circuits: swapping 8-bit portions of an upper half of the upper bits with each other and 8-bit portions of a lower half of the upper bits with each other; and subsequently swapping 16-bit portions of the upper bits with each other; at the second set of input switching circuits: swapping 8-bit portions of an upper half of the lower bits with each other and 8-bit portions of a lower half of the lower bits with each other; and subsequently swapping 16-bit portions of the lower bits with each other; and directing the upper bits from the first set of input switching circuits to the first crossbar and the lower bits from the second set of input switching circuits to the second crossbar.

In some examples, the one or more sets of input switching circuits may include first and second sets of input switching circuits connected to respective first and second crossbars, and for the transpose instruction indicating a bit size of 8 bits, passing the data elements through one or more stages of multiplexers may involve, for each block of sixteen data elements in the source matrix: splitting the block between upper bits and lower bits; at the first set of input switching circuits: for each of four upper adjacent pairs of 4-bit portions of the upper bits, swapping bits of the upper adjacent pairs with each other; subsequently swapping 8-bit portions of an upper half of the upper bits with each other and 8-bit portions of a lower half of the upper bits with each other; and subsequently swapping 16-bit portions of the upper bits with each other; at the second set of input switching circuits: for each of four lower adjacent pairs of 4-bit portions of the lower bits, swapping bits of the lower adjacent pairs with each other; swapping 8-bit portions of an upper half of the lower bits with each other and 8-bit portions of a lower half of the lower bits with each other; and subsequently swapping 16-bit portions of the lower bits with each other; and directing the upper bits from the first set of input switching circuits to the first crossbar and the lower bits from the second set of input switching circuits to the second crossbar.

In some examples, the transpose operation may be performed over a plurality of cycles, whereby in a first cycle of the transpose operation, data elements from the one or more sets of input switching circuits may be provided to only a first lane of the datapath, in each cycle after the first cycle, data elements from the one or more sets of input switching circuits may be provided to an additional lane of the datapath until all lanes of the datapath receive data elements from the one or more sets of input switching circuits, and in each cycle after all lanes of the datapath receive data elements from the one or more sets of input switching circuits, data elements from the one or more sets of input switching circuits may be provided to one fewer lane of the datapath until data elements from the one or more sets of input switching circuits are provided to only a last lane of the datapath.

BRIEF DESCRIPTION OF THE DRAWINGS

FIG. 8 is a diagram illustrating a transpose operation between a source matrix and a result matrix in accordance with an aspect of the disclosure.

DETAILED DESCRIPTION

Overview

Matrix transpose operations are performed more efficiently by avoiding data conflicts along the communication datapath of the matrix transpose unit.

Data conflicts may potentially arise when multiple data elements from the same row of a source matrix are provided to corresponding cells of a result matrix over the same lane. In such a case, those data elements would be provided to the same column of the result matrix, meaning that those multiple data elements would typically occupy the same portion of the datapath. The present disclosure avoids such a conflict by reordering the data elements of the source matrix for transport over the datapath, and then undoing the reordering of the data elements between the datapath and result matrix. The reordering ensures, for each given lane of the datapath over when data elements are moved, that no two data elements going to the same column of the result matrix are transferred over the same portion of the lane.

Reordering operations may include swizzling operations, whereby a position of data elements of one cell may be swapped with the position of data elements of another cell. This can ensure that the data elements for each cell are swapped in a manner so that they are spread across the lane of the datapath so that there is no data conflict.

The swizzling operations may be carried out by a series of multiplex switches. The number of stages of multiplex switches required to perform the swizzle operations can depend on the degree of granularity required in order to properly spread the data elements. For data elements having a relatively large bit width, relatively fewer stages of multiplex switches may be required. Conversely, for data elements having a relatively small bit width, relatively more stages of multiplex switches may be required.

The example systems and methods are capable of completing transpose functions for matrices in which multiple data elements of a single row are sent to a common column in a single cycle. By completing the transpose of these multiple data elements in a single cycle, the transpose unit can keep pace with other components of the system, such as a matrix multiplication unit. Thus, the present disclosure prevents bottlenecking in neural network accelerators due to slow transpose processing, and thus achieves improved latency compared to conventional systems. The improved latency also has the advantage of reducing processing and energy costs of the system, and the solution described herein does not require a significant increase in area taken up by the transpose unit.

Example Systems

Figure 1:
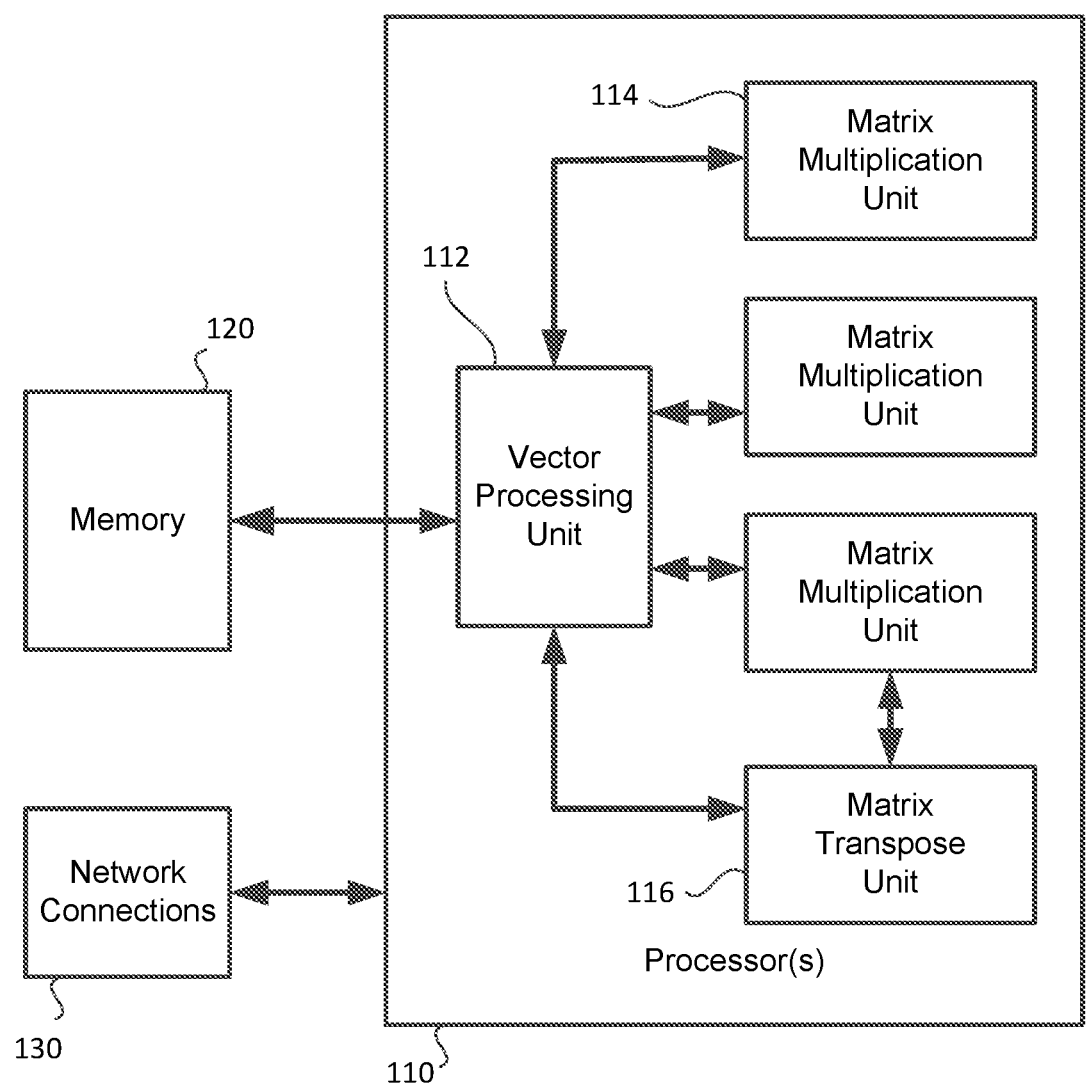
FIG. 1 is a block diagram of an example system in accordance with an aspect of the present disclosure.

FIG. 1 is a block diagram illustrating an example system 100 for processing matrices. In some examples, the system 100 may be a neural network accelerator. The neural network accelerator may be designed particularly to efficiently support processing of machine learning systems such as neural networks, including deep learning architectures, transformer-based network architectures, shallow neural networks, etc.

As shown in FIG. 1, the system may include one or more processors 110, memory 120 and network connections 130 for connecting the processors 110 and memory 120 to one another as well as to external components.

The one or more processors 110 may include a vector processing unit 112 configured to receive vectors of matrix data from the memory 120. The received vectors may be loaded into one or both of the matrix multiplication units (MXU) 114 or matrix transpose unit 116 for processing. Each MXU 114 may be configured to receive each of two matrices—a left hand matrix and a right-hand matrix, and perform a matrix multiplication operation of the two matrices. In some instances, it may be necessary or advantageous to transpose one or both of the left-hand and right-matrices before being loaded into an MXU 114, meaning that the rows of a given matrix become the columns of the transposed matrix and vice versa. For example, for data of a given matrix at cell (0,1), transposing the matrix would result in the data moving to cell (1,0) of the transposed matrix. The transposed matrix may then be provided to one or more MXUs for processing.

In the example of FIG. 1, only a vector processing unit 112 is shown as providing storage for loading data into the MXUs 114. However, in other examples, it should be recognized that additional or alternative structures may be provided for loading data into one or more of the MXUs 114. For example, one or more matrix registers may be provided to hold an entire matrix and feed the entire matrix into the MXUs 114. In some instances, data may be cycled through the MXUs 114 and back to the matrix registers. Additionally, one or more holding registers communicatively positioned between the vector processing unit 112 and the matrix registers may be provided. The holding registers may provide additional functionality, such as converting input data between formats, such as from a data type that is not supported by the MXUs 114 to a different data type that is supported by the MXUs 114. Furthermore, the MXUs 114 can be loaded with the same workload or with separate workloads, in parallel such as for partitions of a matrix or for handling different workloads, in along a processing pipeline.

The matrix transpose unit 116 may be connected to the vector processing unit 112 or other registers in order to receive a source matrix for transposition. The received matrix may be transposed and then the transposed matrix is returned to the vector processing unit 112 or other registers from which the matrix was received. Alternatively, the matrix transpose unit 116 may pass the transposed matrix to a different destination, such as a matrix multiplication unit 114 or a different set of registers. In some examples, it may be possible for the registers themselves or other components positioned along a communication path between the vector processing unit 112 and the MXU 114 to function as the matrix transpose unit 116. In these examples, the received matrix can be transposed from either row-major or column-major format into the transposed matrix, meaning that pre-processing is not required in order to perform the transposition.

The memory 120 may be configured to store either one or both of data and instructions for operating the system 100. Data stored in the memory 120 may include the data from which the data elements of the matrices may be constructed, data indicating results of matrix processing such as matrix multiplication results, or other data. Instructions stored in the memory 120 may include instructions for signals to be provided to the matrix transpose unit 116 in order to properly process the data elements of the matrices, as described herein. In some examples, the memory 120 may be a high bandwidth memory (HBM) having a high throughput for efficient processing.

The network connections 130 may facilitate communication between components of the system 100. For example, the network connections 130 may connect the one or more processors 110 and memory 120 to external components of the system. The network connections 130 may facilitate receiving data or instructions from the external components, or reporting data results to the external components. In the case of a neural network accelerator, such instructions and data may include training input and model parameters for processing, and the outputs may include a result of processing the inputs.

Figure 2:
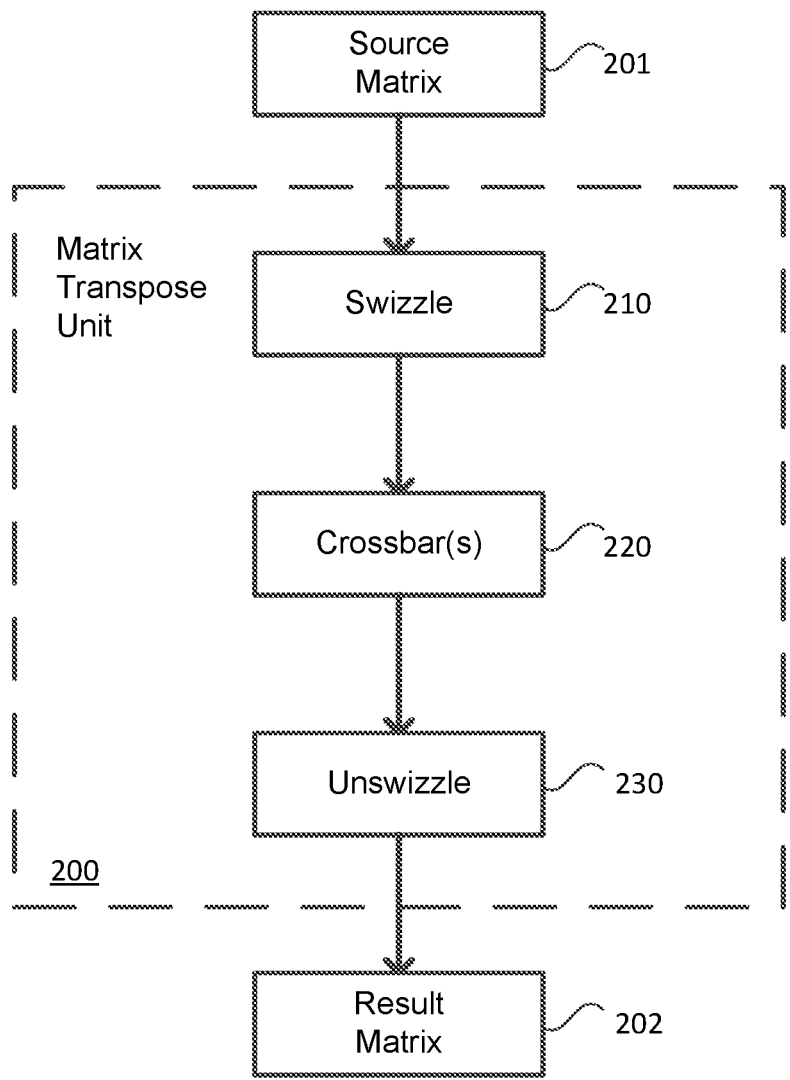
FIG. 2 is a data flow diagram illustrating an example data flow between a source matrix and a result matrix in accordance with an aspect of the present disclosure.

FIG. 2 is a diagram illustrating a data flow within a matrix transpose unit 200, such as the matrix transpose unit 116 of FIG. 1. In the example of FIG. 2, the matrix transpose unit 200 receives a source matrix 201 from a source location. The source matrix may contain an array of data elements, each data element having the same bit width, such as 8 bits, 16 bits or 32 bits. Data elements may be stored within the rows and columns of the source matrix. For each column of the matrix, the number of data elements present in the matrix may depend on the bit width of the elements, whereby a smaller bit width may permit more elements to be packed within the matrix.

In the case of data elements having a small bit width, e.g., 8 bits, in order to process the matrix at the same speed as one with data elements of a larger bit width, it may be necessary to move multiple elements in the same row within the same cycle. Take, for instance, two adjacent elements packed into row i at respective columns j and j+1. In a transpose operation, the data element at (i,j) will be transposed to (j,i) in the result matrix 202, and the data element at (i,j+1) will be transposed to (j+1,i) in the result matrix. In other words, the two elements were originally in different columns of the source matrix 201 but must be transported to the same column of the result matrix 202. This means that moving both data elements over the communication path of the matrix transpose unit 200 would typically require both data elements to be produced on the same half of the communication path data bus, resulting in a data conflict.

The data flow in FIG. 2 avoids the aforesaid data conflict by first performing a swizzle 210 operation, in which one of the data element at (i, j) or the data element at (i,j+1) is moved to a different portion of the communication path so that the two data elements no longer occupy the same portion of the communication path. Next, a datapath communication 220 operation is performed in which the data elements are moved from the source matrix 201 to the destination matrix 202 in their transposed form. Finally, before the data elements can be produced at the result matrix in their correct locations, whichever of the data elements that was moved to a different portion of the communication path must be moved back to its original location so that it arrived at the correct cell of the result matrix 202. This is accomplished through an unswizzle operation 230, which is effectively the inverse operation from that of the swizzle operation 210 performed on the source matrix side of the communication path. Finally, the data elements, which have undergone both reordering and an undoing of the reordering, are provided to the result matrix 202 in their transposed form.

Figure 3:
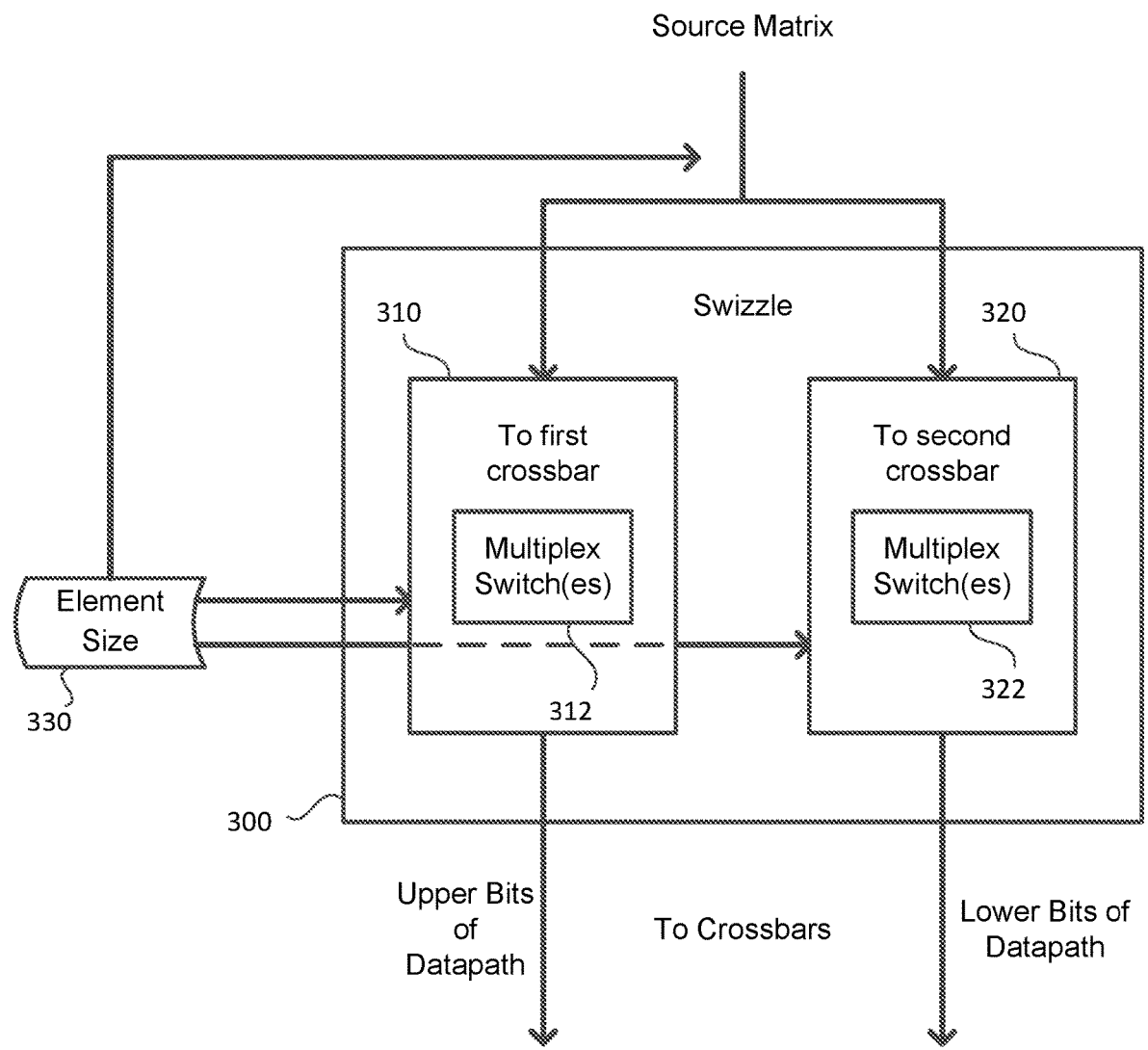
FIG. 3 is a data flow diagram illustrating an example data flow through a crossbar of FIG. 2.

FIG. 3 is a diagram showing an example of a swizzle operation 300, such as the swizzle 210 operation of FIG. 2 in greater detail. It should be understood that the principles shown in FIG. 3 are similarly applicable to the unswizzle 230 operation shown in FIG. 2, but in the inverse form.

In the example of FIG. 3, a matrix transpose unit, e.g., matrix transpose unit 116 as shown in FIG. 1, performs the swizzle operation 300. The matrix transpose unit 116 includes a pair of crossbars, although in other examples a different number of crossbars, such as one, four, eight and so on, may be implemented. Each crossbar is connected to a respective set of switching elements 310, 320 that are capable of receiving a set of inputs and outputting the same set of elements in a different order. In some examples, the set of switching elements 310, 320 may include a sufficient number of switching elements in order to change the order of data elements to any desired order or arrangement. In the example of FIG. 3, the switching elements are shown as multiplex switches 312, 322. Each multiplex switch can receive multiple data inputs and a switching instruction capable of directing the multiplex switch to selectively output the multiple inputs in a particular order. By outputting the data inputs in a certain order, the data inputs can be reordered. The reordered data inputs may then be provided to different portions of the communication datapath of its respective crossbar in such a manner that data elements being provided to the same column of the result matrix are positioned in different non-overlapping portions of the data bus, thereby avoiding a data conflict when moving the data elements over the communication datapath towards the result matrix.

In the example of FIG. 3, the first and second sets of switching elements 310, 320 are arranged to provide data elements to respective halves of the communication datapath. In particular, the data elements passed through the first set of switching elements 310 are directed to a first crossbar that handles the upper half of the datapath such that the data elements provided to the first crossbar become the upper bits in the datapath, and the data elements passed through the second crossbar that handles the lower half of the datapath such that the data elements provided to the second crossbar become the lower bits in the datapath. Thus, the initial dividing of the data elements between the first and second crossbars ensures at least some even spreading of bits across the entire communication datapath, while the multiplex operations performed at each set of multiplex switches 312, 322 ensures even further spreading of the bits across each respective half of the communication datapath.

Also, as shown in the example of FIG. 3, the particular operations performed during the swizzle operation 300 may be controlled based on data contained in an instruction signal. For example, in a matrix transpose unit that is configured to support matrices of data elements of a variety of bit widths, the instruction signal may contain element size data 330 indicating the bit widths of the data elements. The element size data 330 may be used to control which data elements of the source matrix are provided to the first crossbar and which data elements are provided to the second crossbar. The element size data 330 may further be used to control the instructions sent to each of the multiplex switches 312, 322 in order to move the data elements into a proper order that avoids data conflicts on the communication datapath.

Figure 4:
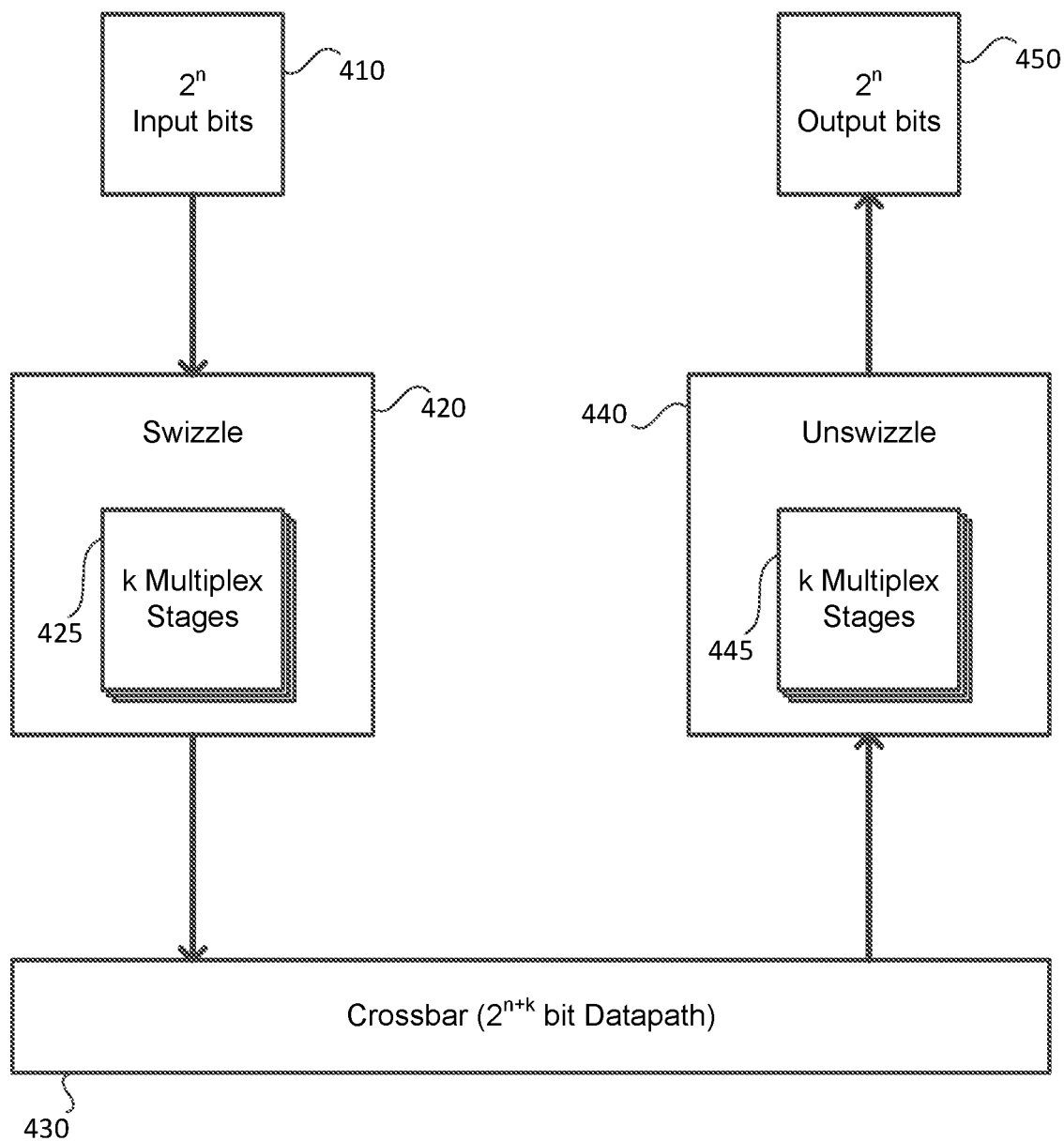
FIG. 4 is a block diagram illustrating a relationship between bit size, datapath bandwidth, and a number of multiplex stages included in the example system of FIG. 1.

FIG. 4 is a block diagram illustrating a relationship between bit size, datapath bandwidth, and a number of multiplex stages included in the example system of FIG. 1. As shown in FIG. 4, the data elements being provided from the source matrix have a bit width of $2^n$ and the datapath has a bandwidth of $2^{(n+k)}$. Stated another way, the communication datapath has a larger bandwidth than the bit width of the data elements by a factor of $2^k$. For example, if the data elements are 32 bits wide and the communication datapath is 64 bits wide, then n=5, n+k=6, meaning k=1 and the datapath is wider by a factor of $2^1$ which is 2. For further example, if the data elements are 16 bits wide and the communication datapath is 64 bits wide, then n=4, n+k=6, meaning k=2 and the datapath is wider by a factor of $2^2$ which is 4. In one last example, if the data elements are 8 bits wide and the communication datapath is 64 bits wide, then n=3, n+k=6, meaning k=3 and the datapath is wider by a factor of $2^3$ which is 8.

Figure 5A:
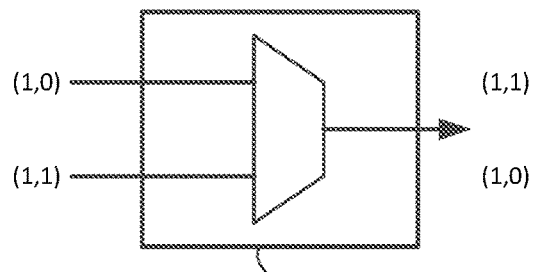
FIGS. 5A, 5B and 5C are diagrams illustrating multiplexing operations in accordance with an aspect of the present disclosure.

In the example of FIG. 4, input bits 410 having a width of $2^n$ bits are processed by a matrix transpose unit performing the swizzle operation 420 with a number k stages of multiplexers 425. In order to properly reorder the input bits, one or more staged swizzle operations may be applied to the input bits. For example, if each data element of the input bits is 32 bits wide, then only a single stage of swizzling is required, in which the upper bits are swapped with the lower bits. This is illustrated in FIG. 5A, in which two data elements at cells (1,0) and (1,1) are swapped using a single multiplexer 510 so that the two data elements instead map to cells (1,1) and (1,0), respectively.

Figure 5B:
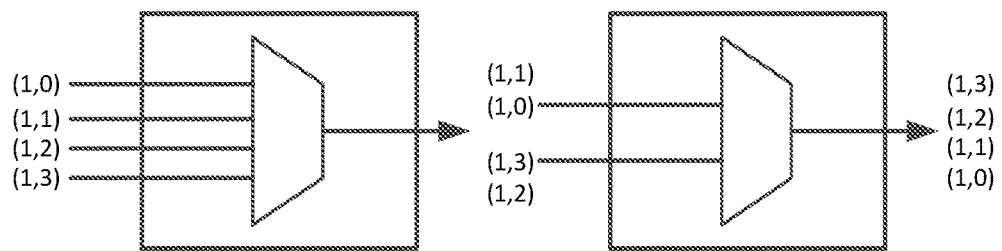

However, if each data element of the input bits is smaller, e.g., each having a bit width of 8 bits or 16 bits, then more swizzling stages are required to properly reorder the data elements. In the case of data elements that are 16 bits wide, an appropriately configured matrix transpose unit can in some examples subdivide the input data elements into upper and lower halves, swap those halves with each other, recombine the swizzled data, and then perform a second swizzle function on the input data. This is illustrated in FIG. 5B, in which four data elements at cells (1,0), (1,1), (1,2), (1,3) are first subdivided into upper and lower halves, then each half undergoes a first swizzle operation at a first multiplexer stage 522 to be reordered as mapping to cells (1,1), (1,0), (1,3), (1,2), and then the upper half (1,1), (1,0) and lower half (1,3), (1,2) are swapped with one another using a second swizzle operation at a second multiplexer stage 524 to be reordered as mapping to cells (1,3), (1,2), (1,1), (1,0), respectively.

The same or similar principles may be applied to data elements of any width. In the last illustrated example of FIG. 5C, eight data elements at cells (1,0), (1,1), (1,2), (1,3), (1,4), (1,5), (1,6), (1,7) are first doubly subdivided into upper and lower halves of respective upper and lower halves, then each pair of doubly subdivided upper and lower halves undergoes a first swizzle operation at a first multiplexer stage 532 to be reordered as mapping to cells (1,1), (1,0), (1,3), (1,2), (1,5), (1,4), (1,7), (1,6), then each of the singly sub-divided upper and lower halves are swapped with one another—meaning (1,1), (1,0) swaps with (1,3), (1,2) and (1,5), (1,4 swaps with (1,7), (1,6)—in a second swizzle operation at a second multiplexer stage 534 to be reordered as mapping to cells (1,3), (1,2), (1,1), (1,0), (1,7), (1,6), (1,5), (1,4), respectively. Finally, in a third swizzle operation at a third multiplexer stage 536, the upper half (1,3), (1,2), (1,1), (1,0) and lower half (1,7), (1,6), (1,5), (1,4) are swapped with one another to be reordered as mapping to cells (1,7), (1,6), (1,5), (1,4), (1,3), (1,2), (1,1), (1,0), respectively.

Figure 5C:
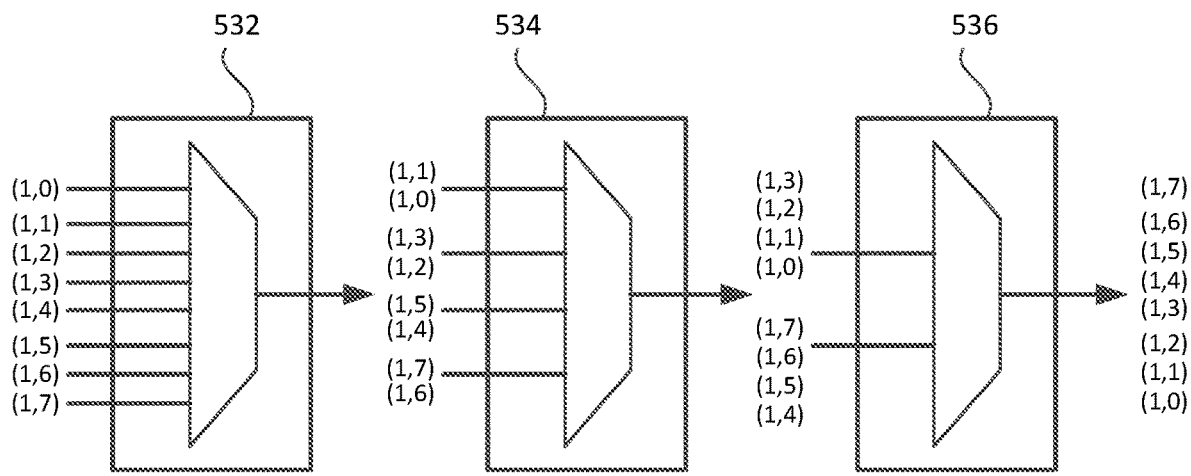

Returning to FIG. 4, the reordered input bits are capable of being passed through the datapath 430 without data conflict, since bits for each lane of the transpose operation on route to the same column of the result matrix are now positioned to not overlap with one another in the data bus. After being passed through the datapath 430 without conflict, the reordering of the bits may be undone by an unswizzle operation 440 having the same number k stages of multiplexers 445 as the swizzle operation 420. The unswizzling multiplexer stages 445 may perform the inverse operations from the swizzling multiplexer stages 425, whereby upper and lower halves of each set of bits may first be swapped with one another, and then further subdivided so that subdivided pairs may be swapped with one another, as shown in FIGS. 5B and 5C but in the reverse order.

Once the reordering of bits has been undone and each data element is back in its proper place, the data elements may be provided as output bits 450 to the columns of the result matrix. In the examples of FIGS. 5A, 5B and 5C, in which data elements from row 1 of the source matrix are described, after the unswizzle operations 440 of FIG. 4 are performed, those data elements may be provided to the respective rows of column 1 of the result matrix. Once the result matrix has been populated with all of the transposed data elements from the source matrix, further operations may then proceed, such as conducting matrix multiplication operations using the transposed matrix.

Figure 6:
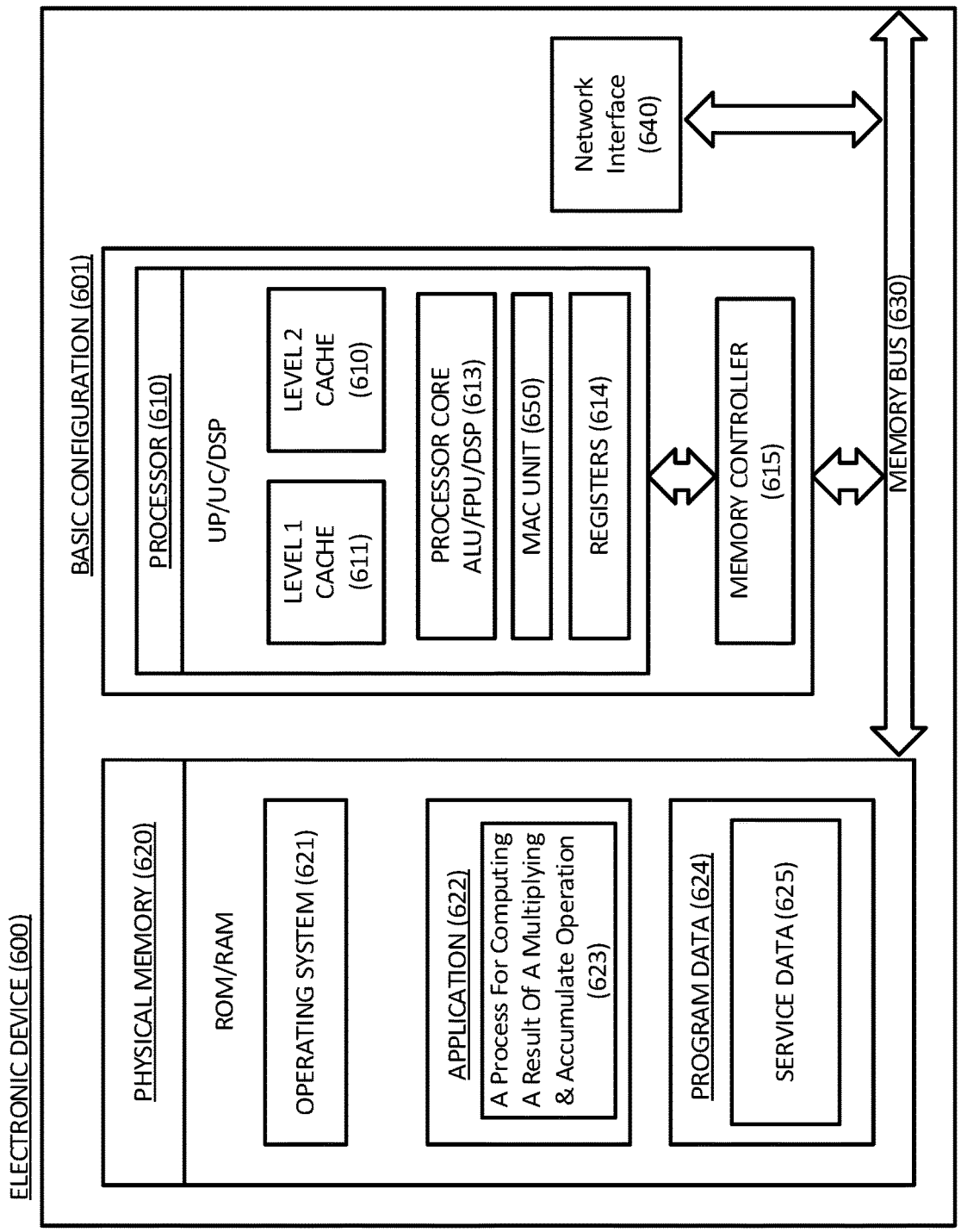
FIG. 6 is a block diagram of an example electronic device in accordance with an aspect of the disclosure.

FIG. 6 depicts a block diagram of an example electronic device 600 for implementing a neural network accelerator in accordance with any of the example embodiments of the present disclosure. The electronic device 600 may include one or more processors 610, such as one or more CPUs, system memory 620, a bus 630, the networking interface(s) 640, and other components (not shown), such as storage(s), output device interface(s), input device interface(s). A bus 630 may be used for communicating between the processor 610, the system memory 620, the networking interface(s) 640, and other components. Any or all components of electronic device 600 may be used in conjunction with the subject of the present disclosure.

Depending on the desired configuration, the processor 610 may be of any type including but not limited to one or more central processing units (CPUs), graphic processing units (GPUs), field-programmable gate arrays (FPGAs), and/or application-specific integrated circuits (ASICs), such as tensor processing units (TPUs), or any combination thereof. The processor 610 may include some or all components of the neural network accelerator, such as a systolic array. The processor 610 may include one more level of caching, such as a level one cache 611 and a level two cache 612, a processor core 613, and registers 614. The processor core 613 may include one or more arithmetic logic units (ALU), one or more floating point units (FPU), one or more DSP cores, or any combination thereof. A memory controller 615 may also be used with the processor 610, or in some implementations the memory controller 615 can be an internal part of the processor 610.

Depending on the desired configuration, the physical memory 620 may be of any type including but not limited to volatile memory, such as RAM, non-volatile memory, such as ROM, flash memory, etc., or any combination thereof. The physical memory 620 may include an operating system 621, one or more applications 622, and program data 624, which may include service data 625. Non-transitory computer-readable medium program data 624 may include storing instructions that, when executed by the one or more processing devices, implement a process for performing matrix transpose operations 623 at speed for data elements of various bit widths. In some examples, the one or more applications 622 may be arranged to operate with program data 624 and service data 625 on an operating system 621.

The electronic device 600 may have additional features or functionality, and additional interfaces to facilitate communications between the basic configuration 601 and any required devices and interfaces.

Physical memory 620 may be an example of computer storage media. Computer storage media includes, but is not limited to, RAM, ROM, EEPROM, flash memory or other memory technology, or any other medium which can be used to store the desired information and which can be accessed by electronic device 600. Any such computer storage media can be part of the device 600.

Network interface(s) 640 may couple the electronic device 600 to a network (not shown) and/or to another electronic device (not shown). In this manner, the electronic device 600 can be a part of a network of electronic devices, such as a local area network ("LAN"), a wide area network ("WAN"), an intranet, or a network of networks, such as the Internet. In some examples, the electronic device 600 may include a network connection interface for forming a network connection to a network and a local communications connection interface for forming a tethering connection with another device. The connections may be wired or wireless. The electronic device 600 may bridge the network connection and the tethering connection to connect the other device to the network via the network interface(s) 640.

The electronic device 600 may include MXUs having a plurality of MAC units 650 to perform multiply and accumulate operations needed for matrix multiplication. The MXUs and the device in which they operate may be used for implementing an accelerator that may be used for DNN implementations.

The electronic device 600 may be implemented as a portion of a small form factor portable (or mobile) electronic device such as a speaker, a headphone, an earbud, a cell phone, a smartphone, a smartwatch, a personal data assistant (PDA), a personal media player device, a tablet computer (tablet), a wireless web-watch device, a personal headset device, a wearable device, an application-specific device, or a hybrid device that include any of the above functions. The electronic device 600 may also be implemented as a personal computer including both laptop computer and non-laptop computer configurations. The electronic device 600 may also be implemented as a server, an accelerator, or a large-scale system.

Example Methods

Figure 7:
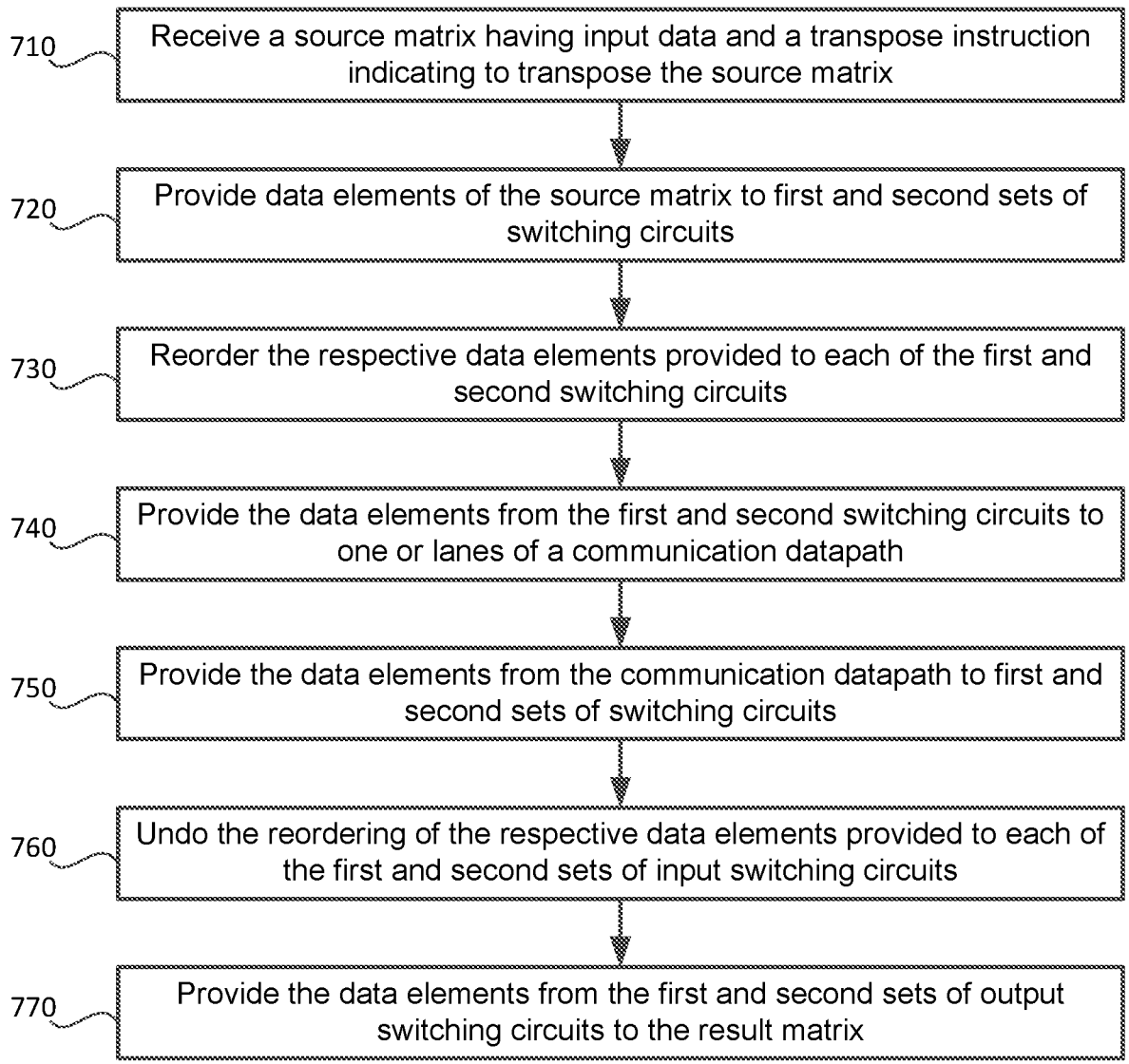
FIG. 7 is a flow diagram of an example process for performing a matrix transpose operation in accordance with an aspect of the disclosure.

FIG. 7 is a flow diagram illustrating an example process 700 for performing matrix transpose operations at speed for data elements of various bit widths, such as 8 bits, 16 bits or 32 bits. The process 700 may be executed by a neural network accelerator or other system in which matrices are transposed, such as is shown in FIG. 1.

At block 710, a source matrix having input data elements is received along with a transpose instruction indicating to perform a transpose operation to transpose the source matrix. Transposing the source matrix involves moving each cell of the source matrix to a corresponding cell of a result matrix, in which the number row of the source matrix cell corresponds to the number column of the result matrix and vice versa.

At block 720, data elements of the source matrix are provided to first and second sets of input switching circuits. The sets of input switching circuits may contain switching elements for reordering the data elements. At block 730, each of the first and second sets of input switching circuits may reorder the respective data elements provided to it. The reordering may be directed based on information in the transpose instruction, such as an indication of the bit width of the data elements in the source matrix.

At block 740, the data elements from the first and second sets of input switching circuits may be provided to one or more of a plurality of lanes of a communication datapath of the matrix transpose circuitry. This may be performed using first and second crossbars. The data elements, by their reordering, may be arranged in such a manner that each respective lane of the datapath receives a plurality of elements in non-overlapping portions of the lane. This ensures that as the data elements are moved from the source matrix, there are no data conflicts as to where each of the elements is located within the lane.

At block 750, the data elements may be provided from the communication datapath to first and second sets of output switching circuits. Like the sets of input switching circuits, the sets of output switching circuits may contain switching elements for reordering the data elements. At block 760, each of the first and second sets of output switching circuits may reorder the respective data elements provided to it. Since the data elements were already reordered at the input end, the reordering occurring at the output end may be a reversal or undoing of the previous reordering, such that each data element is returned to its respective position so that it may be provided to the correct column with the transposed result matrix. Finally, at block 770, the data elements may be provided from the first and second sets of ouput switching circuits to the result matrix, whereby the result matrix is a transposition of the source matrix.

In the example of FIG. 7, all of the operations of blocks 720 through 770 may be performed within a single cycle of the matrix transpose unit. This is possible by sending signaling instructions to all switching elements within the cycle so that all data elements are passed from the source matrix to the result matrix over the datapath within the same cycle.

In other examples, the matrix transpose unit may be configured to perform a matrix transpose operation over the span of multiple cycles. This may be the case where only some transposed data at the result matrix is needed within the first cycle, while other data of the result matrix could be utilized in later cycles. One example case may involve feeding data from the result matrix into a systolic array from matrix multiplication processing. Since data flows into the systolic array over the course of multiple cycles, it may also be possible for the transpose to be staggered over multiple cycles in order for matrix transpose operations to work at speed with the matrix multiplication processing of the systolic array.

Figure 8:
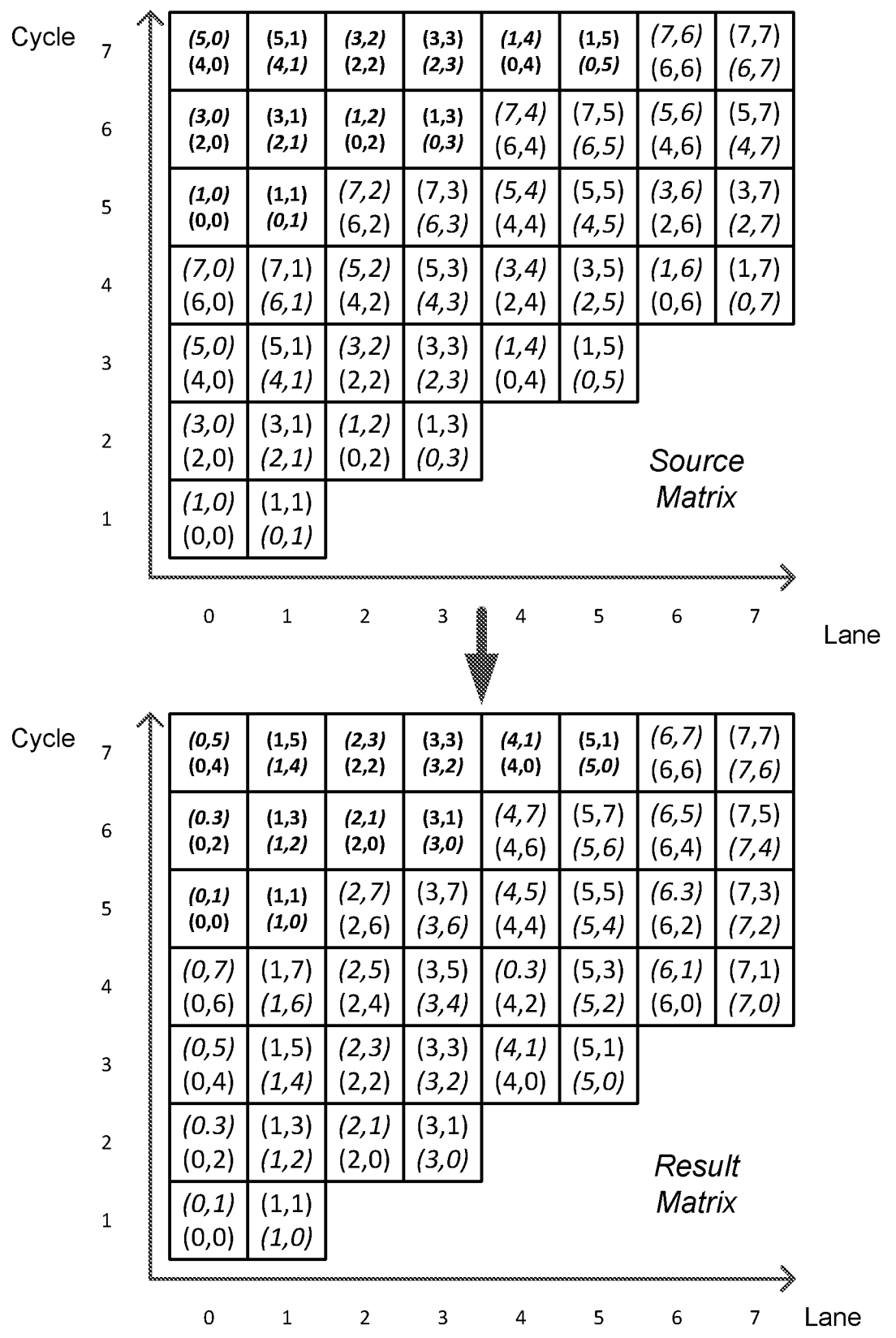

FIG. 8 provides an example of a matrix transpose operation in accordance with the present disclosure where the operation has been divided among a plurality of cycles. In the particular example of FIG. 8, the source matrix is transposed to the result matrix through eight lanes, and two cells of data elements are provided over each lane within each cycle. In the first cycle, data from a first block of four data elements, consisting of the contents of cells (0,0), (0,1), (1,0) and (1,1), are sent from the source matrix to the result matrix over the first two lanes 0 and 1. In the second cycle, data is sent over lanes 0-3. In the third cycle, data is sent over lanes 0-5, and in the fourth cycle, data is sent over lanes 0-7. In each lane of each cycle, the data transmitted is two data elements per lane. These data elements can be provided to different crossbars of the matrix transpose unit. In the example of FIG. 8, data elements provided over the first crossbar are underlined whereas data elements provided over the second crossbar are not italicized.

Continuing at cycle 5 of the example of FIG. 8, it can be seen that all data to be transmitted over lanes 0 and 1 has already been transmitted. As such, if there is another matrix that is waiting to be sent through the matrix transpose unit, the first two lanes of the datapath can be used for this next matrix. In the example of FIG. 8, this next matrix is illustrated by the cell values in bold and a smaller font. Again, as with the initially transposed matrix, italicized cells are passed through the first crossbar whereas the other cells are passed through the second crossbar, meaning that two cells can be sent over each lane for each cycle. Additionally, as future lanes open in future cycles, those lanes can be used for the next matrix. This allows for complete utilization of the datapath bandwidth in order to maintain the at speed pace of transpose processing for multiple matrices.

In some examples of a system configured to perform the matrix transpose operation over multiple cycles, the matrix transpose unit may further include multiple buffers for holding the incoming matrix data. The size of each buffer may correspond to the number of cycles between when a first cycle in which data elements of the source matrix are first received at the datapath and another cycle in which all data elements of the source matrix have been received at the datapath. In the example of FIG. 8, this may correspond to the first cycle and the fourth cycle.

The example systems and methods of the present disclosure demonstrate how multiple data elements can be moved from a common row of a source matrix to a common column of a transposed result matrix in the same cycle of a transpose operation without having to increase the transpose unit logic circuitry by a factor of two or more. This has the advantage of conserving cost and space in the system without sacrificing at speed processing capability. Ultimately, the resulting transpose processing can keep pace with other functions performed by the same system, such as matrix multiplication functions in the case of a neural network accelerator, other accelerator system or chip, or other system requiring matrix transpose functionality.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
    memory configured to store one or more matrices including a source matrix and a result matrix;
    a datapath between the source matrix and the result matrix, the datapath having a plurality of lanes, wherein each lane has a predetermined bandwidth that is divisible into multiple non-overlapping portions;
    one or more sets of input switching circuits;
    one or more sets of output switching circuits; and
    one or more processors configured to:
        receive a transpose instruction indicating to perform a transpose operation to transpose the source matrix;
        provide data elements of the source matrix to each of the one or more sets of input switching circuits;
        reorder the data elements using the one or more sets of input switching circuits;
        provide the data elements from the one or more sets of input switching circuits to one or more of the plurality of lanes of the datapath, wherein each respective lane receiving data elements from the one or more sets of input switching circuits receives multiple data elements directed to different respective non-overlapping portions of the lane;
        provide the data elements from the datapath to each of the one or more sets of output switching circuits;
        undo the reordering of the data elements using the one or more sets of output switching circuits; and
        provide the data elements from the one or more sets of output switching circuits to a result matrix, wherein the result matrix is a transposition of the source matrix.

2. The system of claim 1, further comprising a plurality of buffers, wherein each lane of the datapath is configured to receive data elements of the source matrix from a respective buffer of the plurality of buffers.

3. The system of claim 2, wherein a size of each buffer corresponds to a number of cycles between when a first cycle in which data elements of the source matrix are first received at the datapath and a second cycle in which all data elements of the source matrix have been received at the datapath.

4. The system of claim 1, wherein each of the one or more sets of input switching circuits and the one or more sets of output switching circuits includes at least one multiplexer.

5. The system of claim 4, wherein each of the one or more sets of input switching circuits and the one or more sets of output switching circuits includes a plurality of multiplexer stages, wherein the source matrix comprises data elements of size $2^n$ bits, wherein the predetermined bandwidth of the datapath is $2^{(n+k)}$ bits, wherein k is greater than or equal to 1, and wherein the transpose instruction indicates to reorder and undo the reordering of the data elements of the source matrix using k multiplexer stages.

6. The system of claim 5, wherein a first multiplexer stage of the plurality of multiplexer stages is configured to reorder data elements of size $2^n$ bits, wherein each subsequent stage of the plurality of multiplexer stages is configured to reorder data elements twice as large as the data elements of its respective previous multiplexer stage.

7. The system of claim 4, wherein the one or more sets of input switching circuits includes two sets of input switching circuits, the one or more sets of output switching circuits includes two sets of output switching circuits, the predetermined bandwidth of the datapath is 64 bits, and wherein each of the two sets of input switching circuits and the two sets of output switching circuits includes three stages of multiplexers.

8. The system of claim 7, wherein the system is configured to transpose matrices of 32-bit data elements, matrices of 16-bit data elements, and matrices of 8-bit data elements.

9. The system of claim 8, wherein the one or more processors are configured to:
in response to the transpose instruction indicating the source matrix includes 32-bit data elements, reorder the data elements using one stage of multiplexers;
in response to the transpose instruction indicating the source matrix includes 16-bit data elements, reorder the data elements using two stages of multiplexers; and
in response to the transpose instruction indicating the source matrix includes 8-bit data elements, reorder the data elements using three stages of multiplexers.

10. The system of claim 9, wherein:
the one stage of multiplexers are configured to perform 32-bit swizzles;
the two stages of multiplexers are configured to perform 16-bit swizzles followed by 32-bit swizzles; and
the three stages of multiplexers are configured to perform 8-bit swizzles followed by 16-bit swizzles followed by 32-bit swizzles.

11. The system of claim 1, further comprising one or more matrix multiplication units, wherein the datapath is configured to provide the result matrix to at least one of the matrix multiplication units.

12. The system of claim 11, wherein the system is included in a neural network accelerator.

13. A method comprising:
receiving a source matrix and a transpose instruction indicating to perform a transpose operation to transpose the source matrix;
providing data elements of the source matrix to one or more sets of input switching circuits;
reordering the data elements using the one or more sets of input switching circuits;
providing the data elements from the one or more sets of input switching circuits to one or more of the plurality of lanes of a datapath, each lane having a predetermined bandwidth that is divisible into multiple non-overlapping portions, wherein each respective lane receiving data elements from the one or more sets of input switching circuits receives multiple data elements directed to different respective non-overlapping portions of the lane;
providing the data elements from the datapath to one or more sets of output switching circuits;
undoing the reordering of the data elements using the one or more sets of output switching circuits; and
providing the data elements from the one or more sets of output switching circuits to a result matrix, wherein the result matrix is a transposition of the source matrix.

14. The method of claim 13, wherein reordering the data elements using the one or more sets of input switching circuits comprises passing the data elements through a plurality of multiplexers.

15. The method of claim 13, wherein passing the data elements through a plurality of multiplexers comprises:
receiving a transpose instruction indicating a bit size of each data element in the source matrix to transpose; and
passing the data elements through one or more stages of multiplexers based on the bit size, wherein each bit size is associated with a different number of stages of multiplexers.

16. The method of claim 15, wherein the predetermined bandwidth of the datapath is 64 bits, and wherein passing the data elements through one or more stages of multiplexers based on the bit size comprises selecting between one, two and three stages of multiplexers depending on the bit size.

17. The method of claim 16, wherein the one or more sets of input switching circuits includes first and second sets of input switching circuits connected to respective first and second crossbars, and wherein for the transpose instruction indicating a bit size of 32 bits, passing the data elements through one or more stages of multiplexers comprises, for each block of four data elements in the source matrix:
splitting the block between upper bits and lower bits;
at the first set of input switching circuits, swapping 16-bit portions of the upper bits with each other;
at the second set of input switching circuits, swapping 16-bit portions of the lower bits with each other; and
directing the upper bits from the first set of input switching circuits to the first crossbar and the lower bits from the second set of input switching circuits to the second crossbar.

18. The method of claim 16, wherein the one or more sets of input switching circuits includes first and second sets of input switching circuits connected to respective first and second crossbars, and wherein for the transpose instruction indicating a bit size of 16 bits, passing the data elements through one or more stages of multiplexers comprises, for each block of eight data elements in the source matrix:
splitting the block between upper bits and lower bits;
at the first set of input switching circuits:
swapping 8-bit portions of an upper half of the upper bits with each other and 8-bit portions of a lower half of the upper bits with each other; and
subsequently swapping 16-bit portions of the upper bits with each other;
at the second set of input switching circuits:

swapping 8-bit portions of an upper half of the lower bits with each other and 8-bit portions of a lower half of the lower bits with each other; and subsequently swapping 16-bit portions of the lower bits with each other; and directing the upper bits from the first set of input switching circuits to the first crossbar and the lower bits from the second set of input switching circuits to the second crossbar.

19. The method of claim 16, wherein the one or more sets of input switching circuits includes first and second sets of input switching circuits connected to respective first and second crossbars, and wherein for the transpose instruction indicating a bit size of 8 bits, passing the data elements through one or more stages of multiplexers comprises, for each block of sixteen data elements in the source matrix:

splitting the block between upper bits and lower bits;
at the first set of input switching circuits:
for each of four upper adjacent pairs of 4-bit portions of the upper bits, swapping bits of the upper adjacent pairs with each other;
subsequently swapping 8-bit portions of an upper half of the upper bits with each other and 8-bit portions of a lower half of the upper bits with each other; and
subsequently swapping 16-bit portions of the upper bits with each other;
at the second set of input switching circuits:
for each of four lower adjacent pairs of 4-bit portions of the lower bits, swapping bits of the lower adjacent pairs with each other;
swapping 8-bit portions of an upper half of the lower bits with each other and 8-bit portions of a lower half of the lower bits with each other; and
subsequently swapping 16-bit portions of the lower bits with each other; and
directing the upper bits from the first set of input switching circuits to the first crossbar and the lower bits from the second set of input switching circuits to the second crossbar.

20. The method of claim 15, wherein the transpose operation is performed over a plurality of cycles, wherein in a first cycle of the transpose operation, data elements from the one or more sets of input switching circuits are provided to only a first lane of the datapath, wherein in each cycle after the first cycle, data elements from the one or more sets of input switching circuits are provided to an additional lane of the datapath until all lanes of the datapath receive data elements from the one or more sets of input switching circuits, and wherein in each cycle after all lanes of the datapath receive data elements from the one or more sets of input switching circuits, data elements from the one or more sets of input switching circuits are provided to one fewer lane of the datapath until data elements from the one or more sets of input switching circuits are provided to only a last lane of the datapath.

* * * * *